US010728604B2

United States Patent
James

(10) Patent No.: US 10,728,604 B2
(45) Date of Patent: Jul. 28, 2020

(54) REMOTE CONTROL FOR REMOTELY CONTROLLING AN APPARATUS FOR RECEIVING TELEVISION SIGNALS, CONNECTING TO THE INTERNET AND FUNCTIONING AS A MULTIMEDIA CENTER, AND RELATED SYSTEM THEREOF

(71) Applicant: Saronikos Trading and Services, Unipessoal Lda, Funchal, Madeira (PT)

(72) Inventor: Robert James, Hatfield (GB)

(73) Assignee: Saronikos Trading and Services, Unipessoal LDA, Funchal, Madeira (PT)

( * ) Notice: Subject to any disclaimer, the term of this patent is extended or adjusted under 35 U.S.C. 154(b) by 0 days.

(21) Appl. No.: 14/904,041

(22) PCT Filed: Jul. 9, 2013

(86) PCT No.: PCT/EP2013/064503
§ 371 (c)(1),
(2) Date: Jan. 8, 2016

(87) PCT Pub. No.: WO2015/003743
PCT Pub. Date: Jan. 15, 2015

(65) Prior Publication Data
US 2016/0165294 A1    Jun. 9, 2016

(51) Int. Cl.
*H04N 5/44* (2011.01)
*H04N 21/422* (2011.01)
(Continued)

(52) U.S. Cl.
CPC ....... *H04N 21/4221* (2013.01); *H04N 5/4403* (2013.01); *H04N 5/44543* (2013.01);
(Continued)

(58) Field of Classification Search
CPC ....... H04N 21/42212; H04N 21/42227; H04N 5/4403; H04N 21/4221; H04N 21/42222; H04N 21/4782; H04N 5/44543
See application file for complete search history.

(56) References Cited

U.S. PATENT DOCUMENTS 5,638,061 A * 6/1997 Levin ................. G06F 3/03549
200/5 A
6,075,575 A * 6/2000 Schein ............... H04N 5/44543
345/684
(Continued)

FOREIGN PATENT DOCUMENTS

EP    2 159 774    3/2010
WO   WO 03/044625  5/2003
(Continued)

OTHER PUBLICATIONS

International Search Report for Application No. PCT/EP2013/064503 dated Sep. 27, 2013.
(Continued)

*Primary Examiner* — Brian P Yenke
*Assistant Examiner* — Sean N. Haiem
(74) *Attorney, Agent, or Firm* — Workman Nydegger

(57) ABSTRACT

A remote control for remotely controlling an apparatus capable of working in different operative modes—namely receiving broadcasted signals, connecting to the Internet and functioning as a multimedia center. The remote control is able to cooperate with said television apparatus and comprises rotary means and actuating means. The said remote control is also configured to carry out different functions depending on which of said operative modes of the television apparatus has been selected and in reply to an execution of said rotary means and/or said actuating means of said remote control.

13 Claims, 3 Drawing Sheets

(51) Int. Cl.
  *H04N 21/478* (2011.01)
  *H04N 5/445* (2011.01)
  *H04N 21/4782* (2011.01)

(52) U.S. Cl.
  CPC . *H04N 21/42212* (2013.01); *H04N 21/42222* (2013.01); *H04N 21/42227* (2013.01); *H04N 21/4782* (2013.01); *H04N 2005/4412* (2013.01); *H04N 2005/4432* (2013.01)

(56) References Cited

U.S. PATENT DOCUMENTS

| | | | | |
|---|---|---|---|---|
| 6,493,037 | B1* | 12/2002 | Raiyat | H04N 7/0882 348/465 |
| 6,765,557 | B1* | 7/2004 | Segal | G06F 3/0488 345/173 |
| 7,849,393 | B1* | 12/2010 | Hendricks | H04N 5/4401 715/203 |
| 8,686,944 | B1* | 4/2014 | Charlton | G06F 3/0338 345/163 |
| 8,832,769 | B2* | 9/2014 | Migos | G08C 17/00 340/2.6 |
| 2003/0103088 | A1* | 6/2003 | Dresti | G06F 3/0481 715/835 |
| 2006/0055780 | A1* | 3/2006 | Zemer | G06F 17/30884 348/173 |
| 2006/0059520 | A1* | 3/2006 | Miyazawa | G11B 27/105 725/52 |
| 2007/0058047 | A1* | 3/2007 | Henty | G06F 3/0304 348/211.99 |
| 2010/0118211 | A1* | 5/2010 | Carlsgaard | H04N 5/4403 348/734 |
| 2010/0194678 | A1* | 8/2010 | Venkatasubramanian | G06F 3/03549 345/156 |
| 2010/0315333 | A1* | 12/2010 | Hsu | G06F 3/0346 345/157 |
| 2012/0069131 | A1* | 3/2012 | Abelow | G06Q 10/067 348/14.01 |
| 2012/0162068 | A1* | 6/2012 | Yokobori | H04N 5/4403 345/157 |
| 2012/0242907 | A1* | 9/2012 | Lai | G08C 17/02 348/734 |
| 2014/0067825 | A1* | 3/2014 | Oztaskent | H04N 21/4782 707/748 |
| 2015/0085179 | A1* | 3/2015 | Van Heugten | H04N 5/23212 348/349 |

FOREIGN PATENT DOCUMENTS

| | | |
|---|---|---|
| WO | WO 2008/033777 | 3/2008 |
| WO | WO 2008/130362 | 10/2008 |

OTHER PUBLICATIONS

European Office Action dated Jan. 15, 2018, issued in in European Application No. 13734792.8.

* cited by examiner

REMOTE CONTROL FOR REMOTELY CONTROLLING AN APPARATUS FOR RECEIVING TELEVISION SIGNALS, CONNECTING TO THE INTERNET AND FUNCTIONING AS A MULTIMEDIA CENTER, AND RELATED SYSTEM THEREOF

The present application claims priority from PCT Patent Application No. PCT/EP2013/064503 filed on Jul. 9, 2013, the disclosure of which is incorporated herein by reference in its entirety.

FIELD OF THE INVENTION

It is noted that citation or identification of any document in this application is not an admission that such document is available as prior art to the present invention.

The present invention relates to a remote control for remotely controlling an apparatus capable of receiving broadcasted signals, connecting to the Internet and functioning as a multimedia center, and relative system thereof.

In the following description it will be clear that a television set capable of receiving television signals refers to a television with a screen, or a satellite, cable or terrestrial type Set Top Box, able to receive and display television programs, in the latter case for viewing such programs an external display is used such as a monitor or a television screen. Likewise for television signals it is meant any signal belonging to a transmission of television signals transmitted over the air, cable, or via the Internet (IPTV).

These days, it is known that the majority of apparatus capable of receiving television signals over the air or cable are also able to connect to the Internet giving the user access to the myriad of services and opportunities that connection to the Internet provides; including IPTV. Such apparatus are also able to function as multimedia centers.

This possibility tends to aggravate the complexity of remote controls providing them with a large quantity of keys that only confuses the user and makes the remote control awkward to use. Remote controls are even known that present two distinct keyboards: a typical one for the commands to be imparted to the apparatus when working as a television set on one face of the remote control and an alphanumeric type, such as that of a computer, on the rear face of the remote control when the apparatus is working as a Smart TV connected to the Internet. It is easy to understand the inconveniences of sending erroneous commands from using such a type of remote control.

It is also to be noted that remote controls for televisions are typically made of impact resistant materials and are therefore generally made of ABS plastic ("Acrylonitrile Butadiene Styrene"). This material is fine when the remote control has to give distinct commands, such as changing the channel or selecting features or functions, but does not lend itself to precision controls, as is often necessary if the user is connected to the Internet or when the apparatus is used for video games. This situation is made even worse when the remote control, in order to meet the requirements of having a mouse for the management of Internet functions includes a touchpad, which is normally of the capacitive type, able to perceive a virtual ground effect given by the finger of the user. The poor quality of the material from which touchpads of remote controls for television sets are made, combined with the virtual ground technique, as well as the limited sensitivity to the movement of the user's finger, leads to problems of imprecise commands, which at times, also due to the different characteristics of the user's body and clothing make it almost impossible to impart commands with this kind of known touchpads. Therefore, for the purpose of the present invention, touchpads made according to the techniques of the prior art to control apparatus capable of receiving television signals via air or cable and connecting to the Internet or for use as multimedia centers, are in no way comparable, nor can they be used for the realization of precision remote controls, such as those made using the techniques of a trackball and precision controls.

Moreover, Wireless type keyboards and mouse for use as PC accessories are known, some combined as a single unit, whereas in other solutions it is possible to surf the Internet with a single mouse, taking advantage of a virtual keyboard present on the OSD (On Screen Display) whenever the user has to write search phrases or URLs.

Such command systems, while efficient for use in the Internet, can also be used in the case of television apparatus able to receive broadcasted signals, connecting to the internet and function as a multimedia center, connected by way of a suitable receiver connected to a USB (Universal Serial Bus) slot, but are not able to carry out commands of the actual television itself, for this reason the use of a traditional remote control is still necessary and therefore the user returns to the situation which is the contrary to that accomplished by the present invention.

SUMMARY OF THE INVENTION

The aim of the present invention therefore is to indicate a remote control for remotely controlling an apparatus capable of receiving broadcasted signals, connect to the Internet and to function as a multimedia center, which is easy to use and is controlled with precision, especially when the television is connected to the Internet or functions as a multimedia center.

These and other aims of the invention are achieved with a remote control and a system for remotely controlling an apparatus capable of receiving broadcasted signals and connect to the Internet or function as a multimedia center, as claimed in the appended claims which form an integral part of the present description.

In summary, a remote control for remotely controlling an apparatus capable of receiving broadcasted signals, connecting to the Internet and functioning as a multimedia center is described, which is compact, due to the small number of keys, and easy to use, especially when connected to Internet, due to the use of rotary means, in particular a sphere, or "trackball", embedded in the body of the remote control. Further characteristics of the invention are subject of the appended claims which are considered an integral part of the present description.

BRIEF DESCRIPTION OF THE DRAWINGS

The invention is illustrated in the figures of the accompanying drawings which are meant to be exemplary and non limiting, in which like references are intended to refer to like or corresponding structures or functions.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
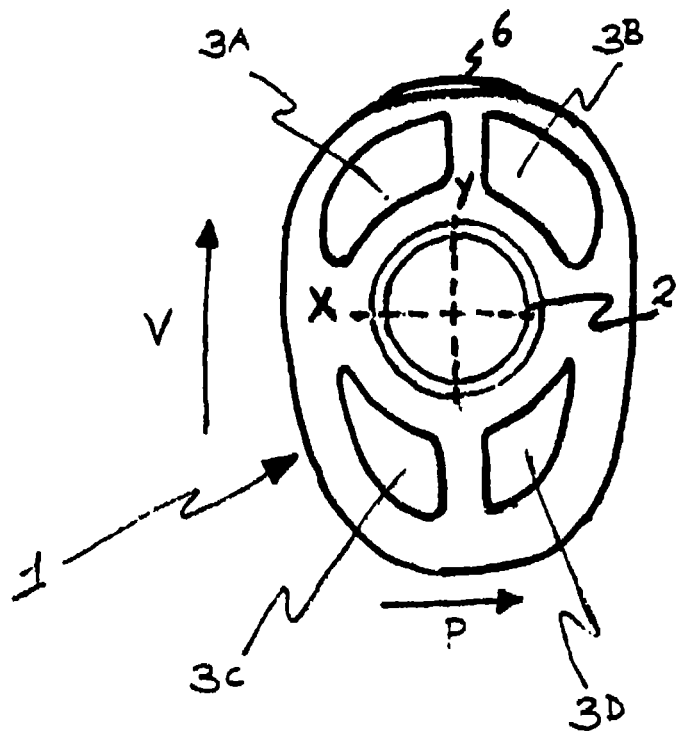
FIG. 1a shows an example, seen from above, of a remote control according to the present invention.

With reference to FIG. 1a, an example, seen from above, of a remote control 1 according to the present invention is illustrated. The remote control 1 includes a housing adapted to accommodate rotary means 2, preferably a sphere, also commonly known as a "trackball". Such rotary means 2 are free to rotate in a cavity of the casing where there are sensor means which detect the movement along an X axis and a Y axis, and are partially accessible from the outside so as to be controlled by the fingers of a user. In a preferred embodiment of the invention the body of the remote control 1, may have external dimensions in the range of 6-12 cm in width and 9-18 cm in length. In this way the remote control presents the maximum in terms of ergonomics. The remote control 1 also comprises actuating means 3A, 3B, 3C and 3D, which comprise at least one key 3A, 3B, 3C and 3D that implements functions that will be described in more detail herein below. Said keys 3A, 3B, 3C and 3D are placed in the vicinity of the rotary means 2 in such a way so as to be easily accessible by a finger of the user's hand, for example the thumb or forefinger. In a preferred embodiment of the invention a first key 3A and a second key 3B are arranged on the upper part of the remote control 1; while a third key 3C and a fourth key 3D are arranged lower part of the remote control 1.

Figure 1B:
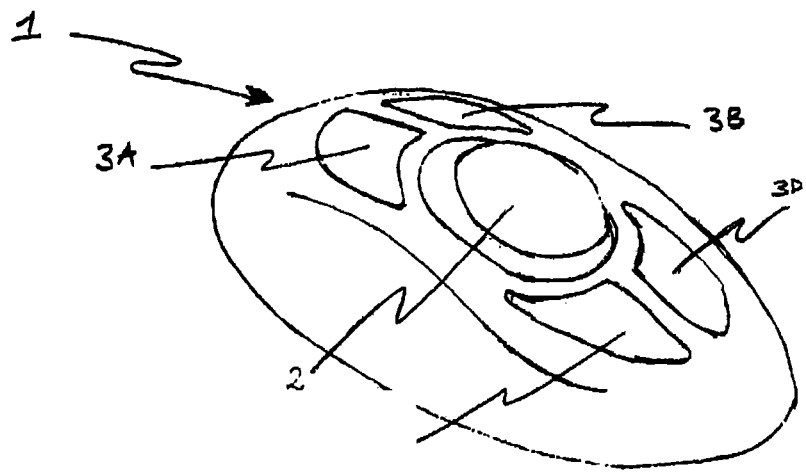
FIG. 1b shows an example of a perspective view of a remote control according to the present invention.

In FIG. 1b a perspective view of a remote control 1 is illustrated, wherein the ergonomics of the unit can be appreciated, which can be used in a single hand. Obviously the remote control 1, contains all the typical electronics of a television remote control unit as well as that of a "trackball" type mouse.

The remote control 1 is adapted to cooperate with a device capable of receiving television signals, via air or cable, connecting to the Internet and functioning as a multimedia center. Such device may be for example a Smart TV capable of receiving an electromagnetic signal from the remote control 1.

In fact, the remote control 1 also comprises transmission means, for example a transmitter, such as IR ("Infrared") or Bluetooth or Wi-Fi Direct, and so on. Said transmission means are able to send an electromagnetic signal to the receiver of the television apparatus, and therefore command the functions thereof. The electromagnetic signal also comprises data relative to the movement of the rotary means 2 with respect to the sensor means. The remote control 1 is also equipped with a microcontroller able to control electronic signals coming from the sensor means of the rotary means 2 and from the keys 3A, 3B, 3C and 3D. Additionally, the microcontroller generates and manages the transmission of the electromagnetic signals from the transmission means to the television apparatus.

The remote control 1 is able to cooperate with the television apparatus in such a way that at least one key of the remote control performs different functions according to the type of operating mode running on the television apparatus. Operating mode refers to, as an example, the viewing of a broadcasted program (in this case the television is tuned to a broadcasted service, hereinafter referred to as "TV" mode) or an Internet browser (hereafter "Internet" mode) or in the situation of functioning as a multimedia center. Additionally, an operating mode may also be that in which applications accessible through the Internet and installed on the television apparatus are displayed (hereinafter "Smart TV" mode), for example, applications of "Facebook", "YouTube", "The Weather", and so on. Another operating mode is that in which Teletext is displayed on a screen associated with said television (hereinafter "Teletext" mode).

In the case in which the television apparatus is in a condition in which it allows for the viewing of a broadcasted service ("TV" mode), in a preferred form of the invention, a first key 3A is configured to perform the "ON/OFF" function of the television apparatus, a second key 3B is configured to perform the "MENU" function of the television apparatus, a third key 3C is configured to perform the "SOURCE" function, that allows for switching between the external sources of the television apparatus, and a fourth key 3D is configured to perform the "ENTER" function, which is useful when a user needs to activate a selected item from the television apparatus.

It is clear that the combination of the four keys 3A, 3B, 3C and 3D described above simply represents a hypothesis of implementing the invention, and that to said keys other functions may be associated, considered crucial for the apparatus, and for this reason such functions require a dedicated key on the remote control rather than simply making a selection by way of the MENU.

Therefore, in the example described above, when the user wants to turn on the television apparatus, the first thing to be done is to press the key 3A. The same key is to be pressed again with the television apparatus on, when the user wishes to turn it off.

It is necessary to note that in the following description reference will be made to television channels "Ch", by television channel it is meant the service that is received or that the user wants to receive, but in reality being a television program/service the references to which are memorized in a program list normally numbered from 1 to 999, that also takes into consideration the LCN (Local Channel Number).

With regards to the rotary means 2, such means are configured to normally perform the function of changing the channel and adjusting the volume. In particular, in the TV mode, a displacement of the rotary means 2 along the longitudinal axis Y of the same allows the function of changing the channel "up" or "down", namely "Ch+" or "CH−". In particular, if a user moves the rotating means 2 along the longitudinal axis Y in a manner concordant with the first line V, the function "Ch+" is executed, that is to say it increases by one unit the position in the list of channels of the channel to be selected and tuned with regards the previous one and/or the one being viewed.

If a user moves the rotary means 2 along the longitudinal axis Y in a manner opposite to the first direction V, the function "Ch−" is then executed, that is to say a decrease by one unit the position in the list of channels of the channel to be selected and tuned with regards the previous one takes place.

This takes place because in the aforementioned list of channels there may be empty slots because a given service may not be receivable in the area where the apparatus is located. Therefore a simple increase or decrease by one unit of the channel number could cause the apparatus to try to tune into an unavailable service.

Similarly, when in the TV mode, a displacement of the rotary means 2 along the transversal axis X of the same allows for obtaining the volume control functions "Vol+" or "Vol−".

In particular, if a user moves the rotary means 2 along the transversal axis X in a manner concordant with the second direction P, the function "Vol+" is then executed, that is to say it increases the volume with regards the actual value. If a user moves the rotary means 2 along the transversal axis X in a manner opposite to the second direction P, the function "Vol−" is then executed, that is to say it decreases the volume compared to the actual level, i.e. the value previously set.

It is easy to note that by using the rotary means 2 the two functions most commonly used are obtained by way of the remote control 1: the change of service/program and the volume control; said rotary means 2 could also be used for carrying out other functions of the television apparatus, present in the various sub-menus.

Whereas in the case in which the television apparatus is in the condition in which it allows the display of a browser ("Internet" mode), such Internet mode is activated by way of the key 3B which activates the "Menu" function from which the Internet mode is reached, a user can easily surf the Internet through use of the remote control 1 realized according to the present invention. In fact, in said Internet mode, the keys 3A, 3B, 3C and 3D and the rotary means 2 perform different functions compared to the previous mode (TV mode). For instance in the Internet mode, the first key 3A acts as "ESC" that allows for exiting the current Internet surfing situation and can also close the browser and cause the apparatus to return to the display of a broadcasted program. The second key 3B acts as "HOME" that allows for instance to view a web page set as default, the third key 3C acts as the so-called "LEFT MOUSE", which is used to confirm a selection on virtual buttons of a web browser and hyperlinks of web pages, and the fourth key 3D acts as the so-called "RIGHT MOUSE", which allows for instance for opening a drop-down menu, and/or pop-up, which includes other useful functions available in a web browser, such as "Print", "Reload", "Cut", "Copy", "Paste" and so forth. Said rotary means 2 are also configured to perform the function of controlling a pointing device. In fact, with every movement along the axis X and/or Y of the rotary means 2 a pointer, visible on the television screen, also moves along the axis X and/or Y, through which it is possible to surf with ease and precision a web browser, pointing directly to links present on the website and virtual buttons of the browser itself. The same pointing function is also active during use of the MENU in the TV mode, also in the multimedia center mode the pointer is used for choosing the various icons or items available (for instance in video games).

In the case in which the television apparatus is in the condition in which it allows for displaying installed applications, such as "Facebook", "YouTube", "The Weather", etc. ("Smart TV" mode), the remote control 1 maintains a configuration similar to that just described for the "Internet" mode. Therefore, the first key 3A is configured to perform the function "ESC" that allows for closing the current application and returning to the previous situation, such as returning to the display of a broadcasted program, the second key 3B is configured to act as "HOME" which allows for viewing the default page of the application screen, the third key 3C is configured to perform the so-called "LEFT MOUSE" function, which is used to confirm a selection of virtual buttons, for example, open an application, and the fourth key 3D is configured to perform the so-called "RIGHT MOUSE" function, which allows for opening a drop down menu, and/or pop-ups, including selectable functional settings, such as "Install App", "Uninstall App" and so forth. With regards to the rotary means 2, also in this case they are configured to perform the function of controlling a pointing device. Therefore, a user can move the pointer on the screen using the rotary means 2 and select a desired application, then the user can open such application and confirm the selection by pressing the third key 3C which allows for the so-called "LEFT MOUSE" function.

When in the multimedia center mode, which is obtained through use of the menu (and its sub-menus, starting from the Smart TV mode) the actuating means 3A, 3B, 3C and 3D can assume, at least partially, functions of primary importance for the apparatus when in such mode, for example zoom and rotating content such as images, or play, stop, fast forward, rewind of multimedia content such as audio and/or video.

To switch from the TV mode to the Internet mode or to Smart TV mode, the user can access the menu of the television apparatus which offers three selectable items on the screen, namely "TV", "Internet" and "Smart TV", the sub-menu relative to the multimedia center is comprised in the latter. When the menu of the television apparatus is active, the rotary means 2 of the remote control 1 operate as a selector switch, which allows to vary the position of a cursor: up, down, left or right. This cursor is uniquely associated to a menu item with each movement. The cursor position changes by moving the rotary means 2 in a manner similar to that described previously for the TV mode, that is to say a displacement of the rotary means 2 along the longitudinal axis Y of the same allows the movement of the cursor to go upwards and downwards. In particular, if a user moves the rotary means 2 along the longitudinal axis Y in a manner concordant with the first direction V, then the cursor moves upwards on the screen over an item. If a user moves the rotary means 2 along the longitudinal axis Y in the opposite direction to V, then the cursor moves downwards over an item. Similarly, a displacement of the rotary means 2 along the transversal axis X of the same allows for the function of moving the cursor right and left. In particular, if a user moves the rotary means 2 along the transversal axis X in a manner concordant with the second direction P, then the cursor moves over an item to the right. If a user moves the rotary means 2 along the transversal axis X in the opposite direction to P, then the cursor moves over an item to the left. Finally, it is to be noted that the selection of a desired function from the menu is achieved by using the key 3D "ENTER". In a variation of the remote control 1, the "ENTER" function could be achieved by pressing the sphere itself of the rotary means 2 in a downward fashion.

Figure 2:
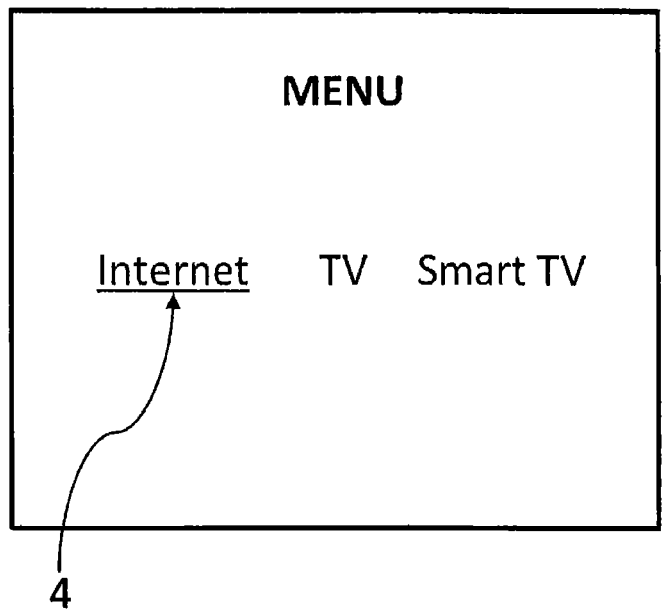
FIG. 2 illustrates an example of a menu of a television apparatus, particularly suitable to be used in conjunction with the remote control subject of the present invention.

With reference to FIG. 2, in fact, an example of the first menu screen of the television apparatus, typical for when selecting which functional mode of the apparatus is to be activated, includes the three items "Internet", "TV" and "Smart TV", that can be selected by way of the cursor 4, for example implemented by way of highlighting, underlining and so forth. The user is then able to confirm the desired item by pressing the fourth key 3D, that allows the "ENTER" function. Therefore, if the menu is activated from the TV mode, the rotary means 2 change their function from volume control and changing the program/channel, to that of moving the cursor up or down, or right or left, while the functions of the keys 3A, 3B, 3C and 3D remain the same.

Figure 3:
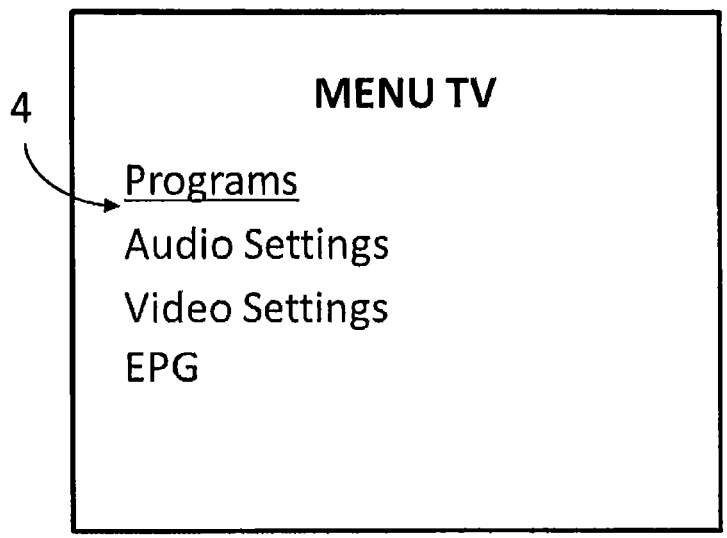
FIG. 3 shows an example of a sub-menu of a television apparatus, particularly suitable to be used in conjunction with the remote control subject of the present invention.

With reference to FIG. 3, an example of a second menu screen is illustrated in the case wherein a user has selected the TV mode from the first screen of FIG. 2. In this case, the menu has a sub-menu that concerns the settings of the television apparatus itself, such as "Programs", "Audio Settings", "Video Settings", "EPG", and so on.

It is clear that the menu of the television apparatus comprises a plurality of screens. With the key 3D "ENTER" the user can open an item from the menu or sub-menu, or confirm a setting input by way of the rotary means 2, and returning to the previous sub-menu, for instance selecting a dedicated item, such as "return".

An additional way for the user to return to the previous screen or situation could be simply by pressing the second key 3B, more precisely "MENU". When the first screen has been reached and the second key 3B is pressed, the menu is closed and the television apparatus returns to the TV mode.

Figure 4:
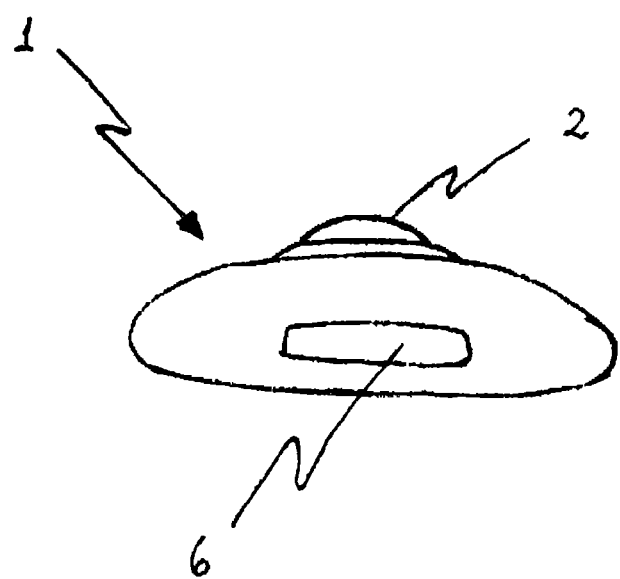
FIG. 4 illustrates an example of a front view of a remote control according to the present invention.

With reference to FIG. 4, aside from the actuating means 3A, 3B, 3C, 3D, and 2, means for adjusting the sensitivity 6 of the rotary means 2 are comprised, in particular a wheel, that is arranged in such a way that it partially exits the body of the remote control 1. For example the wheel could control a potentiometer that provides the microprocessor, which in turn controls the sending of commands from the remote control 1 to the television apparatus, information relative to the desired unitary variations. In this case it is possible to regulate the value of the displacement of the adjustment created by the rotary means 2; i.e. the sensitivity of the command given by the rotary means 2 in its various situations of use: channel change, volume, movement of the cursor on the screen, etc.

More in detail, by acting upon the means for adjusting the sensitivity 6, a user adjusts the proportion of displacement between the rotating means 2 and the cursor present on the screen in the Internet and Smart TV modes. For example, if the means for adjusting the sensitivity 6 are set to a low level of sensitivity, a rotation of the rotary means 2 of 1 mm would corresponds to a displacement of 10 pixels of the cursor on the screen of the television apparatus. If the means for adjusting the sensitivity 6 are set to a high level of sensitivity, but which do not correspond to the maximum possible value, then a rotation of the rotary means 2 of 1 mm corresponds to a displacement of 50 pixels of the cursor on the screen of the television apparatus. Therefore it is possible to modify the sensitivity of the rotary means 2, or its speed of response in relation to the cursor on the screen, in order to better adapt the remote control 1 to the different preferences of its user.

When however the means for adjusting the sensitivity 6 are set to the maximum possible value, the rotating means 2 enable additional operations which will be herein described below. In this case, in order to facilitate the use of the means for adjusting the sensitivity 6, the wheel may incorporate an end of run switch, in either direction, so as that when the user wishes to reach the maximum or minimum level of sensitivity, by simply moving the wheel it becomes evident that the end of run has been reached due to a jump or click that the wheel can produce due to the effect of a spring being charged.

In the case wherein the television apparatus is placed in the TV mode, while the means for adjusting the sensitivity 6 are still in maximum sensitivity mode, a displacement of the rotary means 2 along the longitudinal axis Y of the same changes by a plurality of units the position in the list of channels of the channel to be selected and tuned with respect to the previous one, for instance by ten units, more precisely it implements the "Ch+10" or "Ch−10" functions. In particular, if a user moves the rotary means 2 along the longitudinal axis Y in a manner concordant with the first direction V, the function "Ch+10" is then carried out, in other words, it increases by ten units the position in the list of channels of the channel to be selected and tuned compared with the previous one. If a user moves the rotary means 2 along the longitudinal axis Y in a manner opposite to the first direction V then the function "Ch−10" is carried out, in other words, it decreases by ten units the position in the list of channels of the channel to be selected and tuned compared with the previous one. In general, the channel number can be increased or decreased by a plurality of channels, it is therefore clear that a number different than a value of ten can be implemented without any particular problems, for example, fifteen.

This feature is very useful as normally the number of channels available over air and/or cable is large, in fact, it allows a user to speed up the search of a desired channel.

In the case wherein the television is placed in the Internet or Smart TV mode, a displacement of the rotary means 2 along the longitudinal axis Y of the same allows to execute the so-called "scrolling" function of the current page on the screen. More precisely, if a user moves the rotary means 2 along the longitudinal axis Y in a manner concordant with the first direction V, the page then scrolls upwards. If a user moves the rotary means 2 along the longitudinal axis Y in a manner opposite to the first direction V, the page then scrolls downwards.

Such "scrolling" feature achieved by moving the rotary means 2 along the longitudinal axis Y allows a user to easily visualize parts of a web page, or applications related to the Smart TV mode, not entirely visible on the television screen.

Similarly, a displacement of the rotary means 2 along the transversal axis X of the same allows for changing a web browser tab or page relative to the Smart TV mode, if there are multiple tabs open or pages present. In particular, if a user moves the rotary means 2 along the transversal axis X in a manner concordant with the second direction P, it will then show the tab/page immediately to the right of the previous one. If a user moves the rotary means 2 along the transversal axis X in the opposite direction in relation to P, it will the show the tab/page immediately to the left of the previous one.

Furthermore, if the television apparatus is being operated as a multimedia center of image, audio or video files displacing the rotary means 2, in conjunction with a low sensitivity adjustment of said means for adjusting the sensitivity 6 of the rotary means 2, allows for browsing a single image at a time, while a high sensitivity allows for browsing groups of images with a single movement, for instance ten. Similarly, during the reproduction of an audio recording or a video, with a low sensitivity of the means for adjusting the sensitivity 6, it is possible to activate a fast-forward or rewind function, while a high sensitivity skips from one audio recording or video to the next or backwards.

These are just some examples of the use of the means for adjusting the sensitivity 6. It is in fact clear that once the mechanism for adjusting the effect produced by the rotation of the sphere being part of the rotary means 2 has been introduced, the use of said sphere could produce various effects in the different operational situations of the television apparatus according to the operative mode selected: the operative modes "TV", "Internet", "Smart TV", "Teletext", "Multimedia Center", etc.

Assuming the means for adjusting the sensitivity 6 of the rotary means 2 are set in a position different from that which would allow for the maximum sensitivity of the rotary means 2, and in the case wherein the television apparatus operates in the "Teletext" mode (mode which can be set through the menu of the television apparatus), in other words when the teletext derived from the television signal is displayed on the screen, keys 3A, 3B, 3C and 3D are colored and configured to perform "TOP teletext" functions, in other words the red (previous page), green (subsequent page), yellow (successive topic), and blue (successive block of pages). With regard to the rotary means 2, a displacement of the same along the longitudinal axis Y allows to change the number of the teletext page by ten units, in particular among those available in accordance with the TOP teletext system. More in detail, if a user moves the rotary means 2 along the longitudinal axis Y in a manner concordant with the first direction V, then the number increases by ten units, in particular among those available in accordance with the TOP teletext system. If a user moves the rotary means 2 along the longitudinal axis Y in a manner opposite to the first direction V, then the number decreases by ten units. In general, the number of the teletext page can be increased or decreased by a plurality of units, it is therefore clear that a number different than ten can be implemented without particular problems, for example, fifteen.

Similarly, a displacement of the rotary means 2 along the transversal axis X of the same allows to change the number of the teletext page by one unit. In particular, if a user moves the rotary means 2 along the transversal axis X in a manner concordant with the second direction P, then the number is increased by one unit, in particular among those available in accordance with the TOP teletext system. If a user moves the rotary means 2 along the transversal axis X in a manner opposite to the second direction P, then the number decreases by one unit, in particular among those available in accordance with the TOP teletext system.

When on the other hand the means for adjusting the sensitivity 6 are set to their maximum possible value and the television is operating in the "Teletext" mode, a displacement of the rotary means 2 along the longitudinal axis Y in a manner concordant with the first direction V increases the page number by a unit of hundreds and zeros the tens and units. For example, if the current teletext page is 432 and a user moves the rotary means 2 as described above, the page displayed will be 500. If a user moves the rotary means 2 along the longitudinal axis Y in the opposite direction to the first direction V, then the page number decreases by one unit of hundreds and the tens and units are reset. For example, if the current teletext page is 256, and a user moves the rotating means 2 as just described, the page displayed will be 100.

When on the other hand the means for adjusting the sensitivity 6 are set to their maximum possible value and the television is operating in the "Teletext" mode, a displacement of the rotary means 2 along the longitudinal axis X in a manner concordant with the second direction P produces a skip of the subgroup (topic) from the current one to the next, while a shift of the rotary means 2 along the transversal axis X in a manner opposite to the second direction P, produces a skip of the subgroup (topic) from the current one to the previous one.

The system according to the present invention comprises the remote control 1 and the television apparatus. It is to be noted that the remote control 1 according to the invention is adapted to cooperate with the television apparatus, which is able to receive electromagnetic signals emitted by said remote control 1, and able to carry out different functions depending on the current operating mode of the television apparatus as a consequence of the reception of such electromagnetic signal emitted by said remote control 1. The functional logic of the remote control 1 that allows for performing the different functions can be implemented using a computer program product uploaded to a memory of the television apparatus and comprising portions of software code designed to implement the same logic with the help of existing hardware.

A first advantage of the remote control and system according to the present invention is that of its ease of use, ergonomics in view of its dimensions and the fact that it provides a greater level of accuracy of its controls, especially when the television apparatus is connected to the Internet in particular when using one of the Internet functions, or in the "Smart TV" mode.

A second advantage of the remote control and system according to the present invention is that the number of keys is minimized in relation to the most common needs of a user. It is to be noted that the above described remote control results in being particularly ergonomic in terms of its dimension and the position of its keys.

Moreover, the introduction of the adjustment means 6 allow for obtaining commands of the television apparatus suitable for any type of user, such as young people, the elderly, experts and novices alike, and substantially expanding the functionality of the remote control 1 while making use of just 5 control elements: the sphere and the four keys 3A, 3B, 3C and 3D.

Finally, it is noted that the accuracy and ease of use of the remote control 1 according to the present invention would not even be imaginable if a remote control and a "touch-pad" of impact-resistant plastic were used, being of poor performance from the point of view of the electrical conductivity and of the consequent management of commands.

However, the "track-ball" type rotary means 2 could be replaced by electronic sensors such as gyroscopes, accelerometers, adequate sensors of pressure, sensitivity and accuracy.

There are numerous possible variants to the remote control and system for remotely controlling a television apparatus capable of receiving television signals, connecting to the Internet and functioning as a multimedia center, without for this departing from the principles of novelty inherent in the inventive idea, as it is also clear that in its practical forms of implementation the illustrated details may be different, and the same may be replaced with technically equivalent elements.

Therefore it is easily understandable that the present invention is not limited to a remote control and system for remotely controlling a television apparatus capable of receiving television signals, connecting to the Internet and functioning as a multimedia center, but is subject to various modifications, improvements, and being substituted with equivalent parts and elements without however departing from the inventive idea, as is better defined in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

The invention claimed is:

1. An ergonomic remote control for remotely controlling a television apparatus by providing a simplified interface, the remote control comprising:
   a housing having a top surface that extends between a front end and an opposing back end and that transversely extends between opposing sides; and
   a plurality of control elements consisting of all input elements disposed on the housing that can be operated to provide input to the remote control and that, when operated, provide input to the remote control to carry out different functions on the television apparatus depending on which operative mode of a plurality of different operative modes of the television apparatus is currently active, wherein the plurality of control elements consists only of five different control elements, the five different control elements being:
      a first control element comprising a trackball having a rounded shape and being disposed on the top surface of the housing, the trackball having a central longitudinal axis that extends between the front end and the opposing back end of the housing and a central transverse axis that extends between the opposing sides of the housing; and
      four additional control elements comprising four depressible keys disposed on the top surface of the housing at positions around the trackball such that the trackball is located at a central position relative to the four depressible keys, the four depressible keys being positioned so that two of the four depressible keys are disposed on each opposing side of the central longitudinal axis and so that two of the four depressible keys are disposed on each opposing side of the central transverse axis;
   wherein:
      a sensitivity of the trackball is adjustable,
      the remote control is configured to cooperate with the television apparatus,
      the television apparatus includes different operative modes that include a "TV" mode, an "Internet" mode, a "Smart TV" mode, and a multimedia center type mode,
      the remote control, in reply to an execution of the trackball and/or at least one of the four depressible keys, is configured to carry out the different functions depending on which particular mode is selected from the different operative modes,
      input is received at the remote control as a result of a depression action or a roll action of one or more of the five control elements, the received input causing any one or more of the different functions to be carried out,
      when the "TV" mode is selected:
         a first displacement of the trackball in a longitudinal axis direction adjusts a channel or volume of the television apparatus,
         a second displacement of the trackball in a transverse axis direction adjusts the other of the channel or volume of the television apparatus, whereby, while the "TV" mode is selected, different movements of the trackball cause different functions to be performed,
         the first displacement of the trackball in the longitudinal axis direction increases by one position, in a list of channels, a service to be tuned on the television apparatus in relation to a previous service;
         a third displacement of the trackball in the longitudinal axis direction opposite to said first longitudinal axis direction decreases by one position, in the list of channels, the service to be tuned on the television apparatus in relation to the previous service;
         the second displacement of the trackball in the transverse axis direction increases a volume value of the television apparatus in relation to a current value; and
         a fourth displacement of the trackball in the transverse axis direction opposite to said transverse axis direction decreases the volume value of the television apparatus in relation to the current value;
      when the "Internet" mode is selected, a fifth displacement of the trackball controls a first pointing device;
      when the "Smart TV" mode is active, the trackball is configured to control a second pointing device on the television apparatus; and
      when a menu of the television apparatus is engaged, the trackball is configured to adjust a position of a cursor that is uniquely associated to a menu item with each displacement.

2. The remote control according to claim 1;
wherein the four depressible keys are arranged in proximity to the trackball.

3. The remote control according to claim 2;
wherein the four depressible keys comprise a first key, a second key, a third key, and a fourth key;
wherein the first key and the second key are arranged on an upper part of the remote control; and
wherein the third key and the fourth key are arranged on a lower part of the remote control.

4. The remote control according to claim 3;
wherein, when said television apparatus is operating in the "TV" mode:
   said first key is configured to perform an "ON/OFF" function of the television apparatus;
   said second key is configured to perform a "MENU" function in which the menu is opened on said television apparatus;
   said third key is configured to perform a "SOURCE" function that switches between external sources of said television apparatus; and
   said fourth key is configured to perform an "ENTER" function in which a selection is confirmed.

5. The remote control according to claim 3;
wherein, when said television apparatus operates in the "Internet" mode and displays a web browser:
   said first key is configured to perform an "ESC" function that exits an actual surfing situation, closing the web browser and returning to a display of a broadcasted program;
   said second key is configured to perform a "HOME" function in which a default web page is viewed on the television apparatus;
   said third key is configured to perform a "LEFT MOUSE" function that confirms a selection on virtual buttons of the web browser or a hyperlink of a web page;

said fourth key is configured to perform a "RIGHT MOUSE" function that opens a drop-down menu or a pop-up.

6. The remote control according to claim 3;
wherein, when said television apparatus is operating in the "Smart TV" mode:
said first key is configured to perform an "ESC" function that closes a page of an application and returning to a previous situation;
said second key is configured to perform a "HOME" function in which a default page of said application screen is viewed;
said third key is configured to perform a "LEFT MOUSE" function that confirms a selection on virtual buttons;
said fourth key is configured to perform a "RIGHT MOUSE" function that opens a drop down menu or a pop-up.

7. The remote control according to claim 1;
wherein, when the television apparatus is operating in the multimedia center type mode, the remote control is configured to:
zoom content displayed on the television apparatus;
rotate content displayed on the television apparatus;
play multimedia content displayed on the television apparatus;
stop multimedia content displayed on the television apparatus;
fast forward multimedia content displayed on the television apparatus;
rewind of multimedia content displayed on the television apparatus; or
a combination thereof.

8. The remote control according to claim 1;
wherein the trackball is configured so that pressing down on the trackball effects an "ENTER" function on the television apparatus.

9. The remote control according to claim 1;
wherein the remote control is configured so that when the sensitivity of the trackball is set to a maximum value of sensitivity and said television apparatus is operating in the "Internet" mode or the "Smart TV" mode:
a displacement of the trackball in the longitudinal axis direction effects a scrolling function of a current page on a screen associated with the television apparatus.

10. The remote control according to claim 1;
wherein the remote control is configured so that, when said television apparatus manages image files while operating in the multimedia center type mode and the sensitivity of the trackball is adjusted to a low sensitivity rate, a displacement of the trackball effects a scrolling of images, one at a time, displayed on a screen associated with the television apparatus.

11. The remote control according to claim 1;
wherein the remote control is configured so that, when said television apparatus manages image files while operating in the multimedia center type mode and the sensitivity of the trackball is adjusted to a high sensitivity rate, a displacement of the trackball effects a scrolling of groups of images, displayed on a screen associated with the television apparatus.

12. The remote control according to claim 1;
wherein the remote control is configured so that, when said television apparatus manages audio and video files while operating in the multimedia center type mode and the sensitivity of the trackball is adjusted to a low sensitivity rate, a displacement of the trackball effects a fast forward or rewind function.

13. The remote control according to claim 1;
wherein the remote control is configured so that, when said television apparatus manages audio and video files while operating in the multimedia center type mode and the sensitivity of the trackball is adjusted to a high sensitivity rate, a displacement of the trackball effects changing a current audio file or video to a previous or next audio file or video respectively.

* * * * *